(12) United States Patent
Miura et al.

(10) Patent No.: US 10,139,815 B2
(45) Date of Patent: Nov. 27, 2018

(54) CHILLER CONTROL DEVICE, CHILLER, AND CHILLER DIAGNOSTIC METHOD

(71) Applicant: MITSUBISHI HEAVY INDUSTRIES THERMAL SYSTEMS, LTD., Tokyo (JP)

(72) Inventors: Takaaki Miura, Tokyo (JP); Kenji Ueda, Tokyo (JP); Yoshie Kanki, Tokyo (JP); Minoru Matsuo, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 191 days.

(21) Appl. No.: 15/107,363

(22) PCT Filed: Feb. 24, 2015

(86) PCT No.: PCT/JP2015/055127
§ 371 (c)(1),
(2) Date: Jun. 22, 2016

(87) PCT Pub. No.: WO2015/129657
PCT Pub. Date: Sep. 3, 2015

(65) Prior Publication Data
US 2017/0003679 A1    Jan. 5, 2017

(30) Foreign Application Priority Data
Feb. 28, 2014   (JP) .................................. 2014-039908

(51) Int. Cl.
*G05B 23/02* (2006.01)
*F25B 1/10* (2006.01)
(Continued)

(52) U.S. Cl.
CPC ............ *G05B 23/0221* (2013.01); *F25B 1/10* (2013.01); *F25B 25/005* (2013.01); *F25B 40/02* (2013.01);
(Continued)

(58) Field of Classification Search
CPC ......... G05B 23/0221; F25B 1/10; F25B 40/02
See application file for complete search history.

(56) References Cited

U.S. PATENT DOCUMENTS

| 6,092,171 | A | * | 7/2000 | Relph .................. G06K 15/00 358/1.15 |
| 2004/0085796 | A1 | | 5/2004 | Tatsumi |

(Continued)

FOREIGN PATENT DOCUMENTS

| CN | 1499636 A | 5/2004 |
| CN | 102345950 A | 2/2012 |

(Continued)

OTHER PUBLICATIONS

Chinese Office Action dated Jun. 23, 2017 in corresponding Chinese Application No. 201580003437.3 with an English Translation.

*Primary Examiner* — Vincent H Tran
(74) *Attorney, Agent, or Firm* — Birch, Stewart, Kolasch & Birch, LLP (57) ABSTRACT

This chiller control device (74) is provided with: a storage unit (18) which stores operation data detected at each site in a turbo chiller; a compression unit (34) which, when the size of the operation data accumulated over time in the storage unit (18) becomes too large, converts the operation data each time a condition depending on the type of operation data is met, thereby compressing the data size; and a diagnostic unit (36) which evaluates the state of the turbo chiller on the basis of the operation data converted by the compression unit (34). By this means, the state of the chiller can be diagnosed without increasing the storage capacity of the (Continued)

storage medium that stores operation data of the turbo chiller.

7 Claims, 4 Drawing Sheets

(51) Int. Cl.
*F25B 25/00* (2006.01)
*F25B 40/02* (2006.01)
*F25B 41/04* (2006.01)
*F25B 49/02* (2006.01)
*F25B 1/053* (2006.01)
*F25B 31/02* (2006.01)
*F25B 49/00* (2006.01)

(52) U.S. Cl.
CPC .......... *F25B 41/043* (2013.01); *F25B 49/022* (2013.01); *F25B 1/053* (2013.01); *F25B 31/023* (2013.01); *F25B 49/005* (2013.01); *F25B 2339/047* (2013.01); *F25B 2341/0662* (2013.01); *F25B 2400/13* (2013.01); *F25B 2400/23* (2013.01); *F25B 2600/0261* (2013.01); *F25B 2600/2501* (2013.01); *F25B 2700/193* (2013.01); *F25B 2700/195* (2013.01); *F25B 2700/197* (2013.01); *F25B 2700/21161* (2013.01); *F25B 2700/21163* (2013.01); *F25B 2700/21171* (2013.01); *F25B 2700/21172* (2013.01); *F25B 2700/21173* (2013.01); *G05B 2219/2613* (2013.01)

(56) References Cited

U.S. PATENT DOCUMENTS

| | | | | |
|---|---|---|---|---|
| 2010/0325132 | A1* | 12/2010 | Liu | G06F 17/30516 707/759 |
| 2012/0029889 | A1 | 2/2012 | Togano et al. | |
| 2012/0053898 | A1* | 3/2012 | Togano | F25B 1/053 702/182 |
| 2013/0246721 | A1* | 9/2013 | Fukutomi | G06F 3/0604 711/155 |
| 2014/0040276 | A1* | 2/2014 | Chen | G06F 17/30551 707/746 |
| 2014/0122022 | A1* | 5/2014 | Chen | H04L 67/12 702/181 |
| 2014/0173339 | A1* | 6/2014 | Kaneda | G06F 11/1415 714/15 |
| 2014/0250983 | A1* | 9/2014 | Spino | G01N 11/14 73/54.43 |
| 2014/0260385 | A1* | 9/2014 | Umeda | F25B 49/02 62/180 |
| 2015/0178013 | A1* | 6/2015 | Rostoker | G06F 3/0608 711/115 |

FOREIGN PATENT DOCUMENTS

| | | |
|---|---|---|
| CN | 102384855 A | 3/2012 |
| CN | 102707713 A | 10/2012 |
| JP | 2003-15734 A | 1/2003 |
| JP | 2005-49945 A | 2/2005 |
| JP | 2011-3038 A | 1/2011 |
| JP | 2012-52733 A | 3/2012 |
| JP | 2013-36632 A | 2/2013 |

* cited by examiner

CHILLER CONTROL DEVICE, CHILLER, AND CHILLER DIAGNOSTIC METHOD

TECHNICAL FIELD

The present invention relates to a chiller control device, a chiller, and a chiller diagnostic method.

BACKGROUND ART

A control device of a chiller such as a turbo chiller is configured such that only data required for controlling a device is input and stored. Accordingly, a storage capacity of a storage medium for storing data is small.

In order to diagnose an operation state, a failure prediction, or the like of a chiller, detailed operation data such as temperature data or pressure data of the device constituting the chiller is required, and various operation data should be accumulated (stored) in time series. Accordingly, more accurate diagnosis is possible as an amount of accumulation of the operation data increases. Therefore, it is necessary to increase the storage capacity of the storage medium for storing the operation data.

Accordingly, as described in PTL 1, in order to diagnose the operation state, the failure prediction, or the like of the chiller, the diagnosis is performed by a device including a storage medium having a larger storage capacity such as a control board or a remote monitoring device which is provided outside the chiller.

CITATION LIST

Patent Literature

[PTL 1] Japanese Unexamined Patent Application Publication No. 2012-52733

SUMMARY OF INVENTION

Technical Problem

However, in a case where diagnosis of a chiller is performed by a control panel, a remote monitoring device, or the like, it is necessary to collect operation data from the chiller via a communication line. However, a communication data amount which is transmittable and receivable via the communication line is limited, and the diagnosis may be performed by only the limited operation data. In addition, there is a chiller in which the remote monitoring device is not introduced, and in this chiller, the diagnosis itself may be not performed.

Therefore, preferably, diagnosis using more operation data is performed by a control device capable of collecting the operation data without using the communication line. However, as described above, the storage capacity of the storage medium included in the control device is small, and if the storage capacity increases, a cost increases.

The present invention is made in consideration of the above-described circumstances, and an object thereof is to provide a chiller control device, a chiller, and a chiller diagnostic method capable of diagnosing the state of the chiller without increasing a storage capacity of the storage medium which stores the operation data of the chiller.

Solution to Problem

In order to achieve the object, a chiller control device, a chiller, and a chiller diagnostic method of the present invention adopt the following means.

According to a first aspect of the present invention, there is provided a chiller control device, including: storage means for storing operation data which is detected at each site in a chiller; compression means for converting, when the size of the operation data accumulated in the storage means over time increases, the operation data each time a condition corresponding to the type of the operation data is met, and compressing the data size; and state evaluation means for evaluating the state of the chiller on the basis of the operation data which is converted by the compression means.

According to this configuration, the operation data which is detected at each site of the chiller is stored in the storage means. For example, each site of the chiller is a relay, an inverter, a compressor, a heat exchanger, or the like. For example, the operation data is the number of times of opening and closing of the relay, a temperature of the inverter, an electric motor current and an evaporator pressure of the compressor, a cooling water outlet temperature, a condensation-saturation temperature, and a cooling water flow rate of the heat exchanger, or the like.

If the operation data is accumulated in the storage means over time, the data size increases. In order to continuously store the operation data having the increased data size, the storage capacity of the storage means should be increased.

Accordingly, with respect to the operation data having the increased data size, the operation data is converted by the compression means each time the condition corresponding to the type of the operation data is met, and the data size is compressed. Accordingly, since the data size of the operation data decreases, it is not necessary to increase the storage capacity of the storage means. For example, the condition corresponding to the type of the operation data is a continuous operation time of the chiller, or the like. In addition, the conversion is extracting an evaluable and necessary portion in the state of the chiller by smoothing the operation data using averaging, approximating, or the like.

In addition, the state of the chiller is evaluated by the state evaluation means on the basis of the operation data converted by the compression means.

Therefore, according to this configuration, it is possible to diagnose the state of the chiller without increasing the storage capacity of the storage medium which stores the operation data of the chiller. Moreover, according to this configuration, since the state of the chiller can be diagnosed by the chiller control device, unlike the related art, a customer who does not have a remote monitoring device or the like having a diagnosis function can perform the diagnosis of the chiller. In addition, since the operation data which is detected at each site of the chiller is compressed and stored, a long-term diagnosis at each site of the chiller can be performed by the chiller control device.

In the first aspect, preferably, the compression means compresses the data size by smoothing the operation data for every division corresponding to a size of an operation parameter of the chiller, and the state evaluation means calculates a difference between the operation data compressed by the compression means and a reference value corresponding to the division, and evaluates the operation state of the chiller by comparing the difference and a threshold value corresponding to the division.

According to this configuration, the operation data for every division corresponding to the size of the operation parameter of the chiller is classified. For example, the operation parameter of the chiller is an output load or a vane opening, and the division is an output load ratio or an angle of the vane opening.

The operation data is smoothened by the compression means for every division corresponding to the size of the operation parameter of the chiller. In addition, the difference between the compressed operation data and the reference value corresponding to the division is calculated, the difference and the threshold value corresponding to the division are compared with each other, and the operation state of the chiller is evaluated.

Therefore, according to this configuration, it is possible to evaluate the state of the chiller by simple processing without increasing the storage capacity of the chiller control device.

In the first aspect, preferably, the state evaluation means informs a different evaluation result according to a deviation state between the difference and the threshold value.

According to this configuration, a manager of the chiller can correctly determine the state of the chiller.

According to a second aspect of the present invention, there is provided a chiller including the above-described chiller control device.

According to a third aspect of the present invention, there is provided a chiller diagnostic method, including: a first step of storing operation data, which is detected at each site in a chiller, in storage means; a second step of converting, when the size of the operation data accumulated in the storage means over time increases, the operation data each time a condition corresponding to the type of the operation data is met, and compressing the data size; and a third step of evaluating the state of the chiller on the basis of the compressed operation data.

Advantageous Effects of Invention

The present invention provides a remarkable effect which can diagnoses the state of the chiller without increasing the storage capacity of the storage medium which stores the operation data of the chiller.

DESCRIPTION OF EMBODIMENTS

Hereinafter, an embodiment of a chiller control device, a chiller, and a chiller diagnostic method according to the present invention will be described with reference to the drawings.

Figure 1:
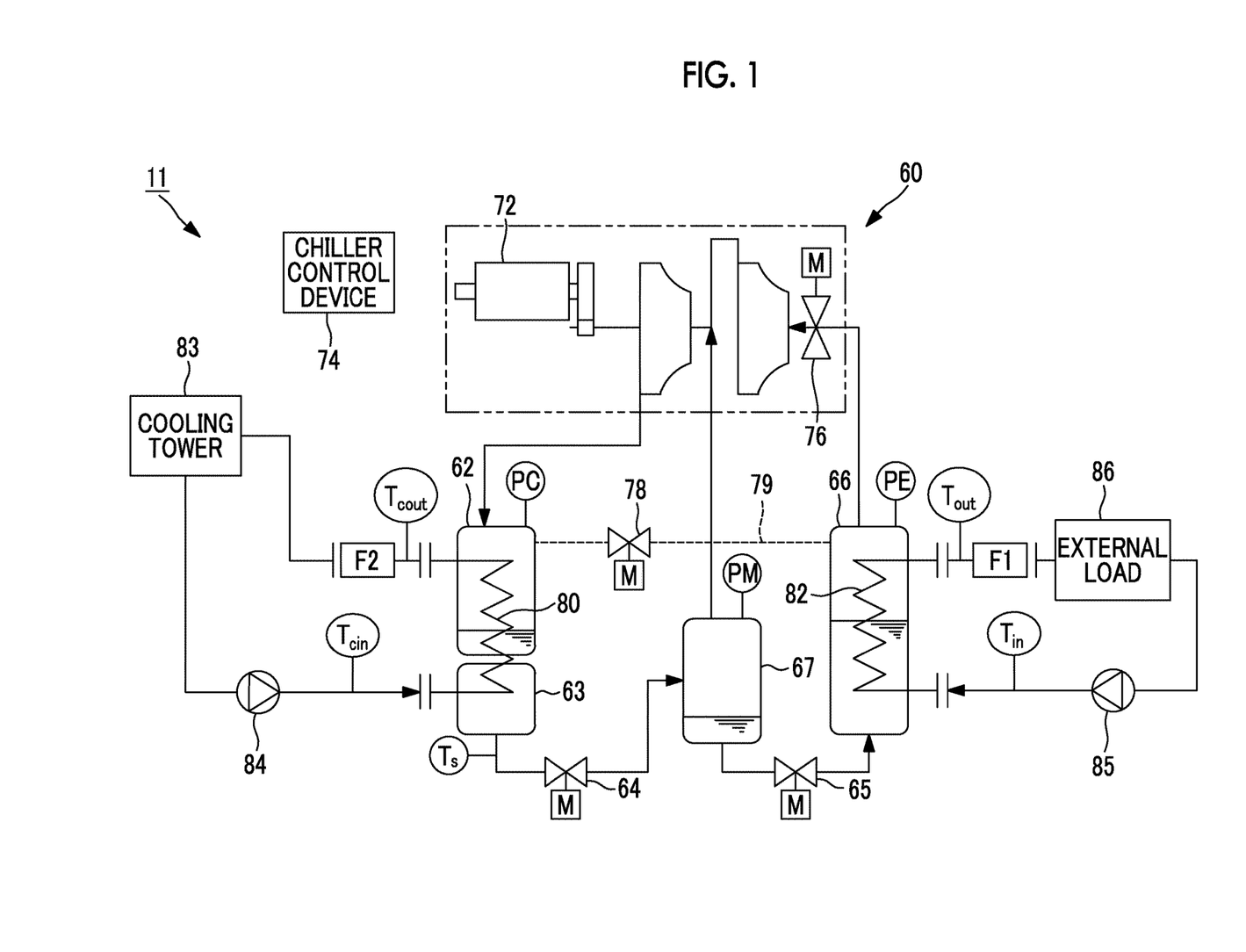
FIG. 1 is a diagram showing a schematic configuration of a turbo chiller according to an embodiment of the present invention.

FIG. 1 is a diagram showing a schematic configuration of a turbo chiller 11.

The turbo chiller 11 applies cold heat to chilled water which is supplied to an external load 86 such as an air conditioner or a fan coil. The turbo chiller 11 includes a turbo compressor 60 which compresses a coolant, a condenser 62 which condenses a high-temperature and high-pressure gas coolant compressed by the turbo compressor 60, a sub cooler 63 which supercools a liquid coolant condensed by the condenser 62, a high pressure expansion valve 64 which expands the liquid coolant from the sub cooler 63, an intermediate cooler 67 which is connected to the high pressure expansion valve 64 and is connected to an intermediate step of the turbo compressor and a low pressure expansion valve 65, and an evaporator 66 which evaporates the liquid coolant expanded by the low pressure expansion valve 65.

The turbo compressor 60 is a two-stage centrifugal compressor, and is a fixed speed machine which is driven at a constant rotation number. In addition, the fixed speed machine is exemplified in FIG. 1. However, a turbo compressor in which the rotation number is variably controlled by an inverter may be used. An inlet guide vane (hereinafter, referred to as an "IGV") 76 which controls a flow rate of the suction coolant is provided in the coolant suction port of the turbo compressor 60, and a capacity of the turbo chiller 11 can be controlled.

A condensed coolant pressure sensor PC for measuring a condensed coolant pressure is provided in the condenser 62. The sub cooler 63 is provided on the downstream side of the coolant flow of the condenser 62, and is provided so as to supercool the condensed coolant. A temperature sensor Ts which measures the temperature of the supercooled coolant is provided immediately after the downstream side of the coolant flow of the sub cooler 63.

A cooling water pipe 80 for cooling the condenser 62 and the sub cooler 63 is provided in the condenser 62 and the sub cooler 63. The cooling water pipe 80 is connected to a cooling tower 83, and a cooling water circulates through portions among the condenser 62, the cooling tower 83, and the sub cooler 63 via the cooling water pipe 80. The circulating cooling water absorbs a condensation heat (exhaust heat) from the coolant in the condenser 62, radiates the absorbed heat in the cooling tower 83, and is returned to the sub cooler 63. The heat radiated in the cooling tower 83 undergoes heat exchange with the outside air. In this way, the exhaust heat discharged when the coolant is condensed by the condenser 62 is removed by the cooling tower 83. The cooling water flowing through the cooling water pipe 80 is pressurized and fed by a cooling water pump 84 which is installed in the cooling water pipe 80. The cooling water pump 84 is driven by an inverter motor for cooling water pump (not shown). Accordingly, it is possible to variably control a discharge flow rate of the cooling water pump 84 by changing the rotation number of the inverter motor.

A cooling water inlet temperature is measured by a temperature sensor Tcin which is installed in the vicinity of the inlet of the sub cooler 63 of the cooling water pipe 80, a cooling water outlet temperature is measured by a temperature sensor Tcout which is provided in the vicinity of the outlet of the condenser 62 of the cooling water pipe 80, and the cooling water flow rate is measured by a flow meter F2 which is installed in the cooling water pipe 80.

A pressure sensor PM for measuring an intermediate pressure is provided in the intermediate cooler 67.

A pressure sensor PE for measuring an evaporation pressure is provided in the evaporator 66. Chilled water having a rated temperature (for example, 7° C.) is obtained by sucking heat in the evaporator 66. That is, the heat of the chilled water flowing in a chilled water pipe 82 inserted into the evaporator 66 is deprived by the coolant, and the chilled water is cooled. The chilled water flowing through the chilled water pipe 82 is pressurized and fed by a chilled water pump 85 which is stalled in the chilled water pipe 82. The chilled water pump 85 is driven by an inverter motor for chilled water pump (not shown). Accordingly, it is possible to variably control a discharge flow rate of the chilled water pump 85 by changing the rotation number of the inverter motor.

A chilled water inlet temperature is measured by a temperature sensor Tin which is installed in the vicinity of the inlet of the evaporator 66 of the chilled water pipe 82, a chilled water outlet temperature is measured by a temperature sensor Tout which is provided in the vicinity of the outlet of the evaporator 66 of the chilled water pipe 82, and the cooling water flow rate is measured by a flow meter F1 which is installed in the cooling water pipe 82.

A hot gas bypass pipe 79 is provided between a gas phase portion of the condenser 62 and a gas phase portion of the evaporator 66. In addition, a hot gas bypass valve 78 for controlling the flow rate of the coolant flowing in the hot gas bypass pipe 79 is provided. By adjusting a hot gas bypass flow rate using the hot gas bypass valve 78, it is possible to perform a capacity control in a significantly small region in which the control is not sufficient performed in the IGV 76.

FIG. 1, measurement values measured by various sensors such as the pressure sensor PC are sent to a chiller control device 74. In addition, the chiller control device 74 controls openings of the IGV 76 and the hot gas bypass valve 78.

In the turbo chiller 11 shown in FIG. 1, the case is described in which the condenser 62 and the sub cooler 63 are provided, heat exchange is performed between the cooling water in which heat is discharged to the outside in the cooling tower 83 and the coolant, and the cooling water is heated. However, for example, instead of the condenser 62 and the sub cooler 63, an air heat exchanger may be installed, and heat exchange may be performed between the outside air in the air heat exchanger and the coolant. In addition, the present invention is not limited to the case where the turbo chiller 11 has only the above-described cooling function. For example, the turbo chiller 11 may have only a heating function, or may have both the cooling function and a heating function. Moreover, a medium which undergoes heat exchange with the coolant may be water or air.

Next, a state evaluation of the turbo chiller 11 which is performed in the chiller control device 74 included in the above-described turbo chiller 11 will be described with reference to the drawings.

For example, the chiller control device 74 includes a Center Processing Unit (CPU), a Random Access Memory (RAM), a Read Only Memory (ROM), a computer readable nonvolatile storage medium, or the like. In addition, as an example, a series of processing for realizing various functions is stored in a storage medium or the like in a program type, the CPU reads the program on the RAM or the like, and various functions are realized by performing processing and calculation processing of information. In addition, as the program, a program which is installed in the ROM or other storage mediums in advance, a program which is supplied in a state of being stored in a computer readable storage medium, or a program which is transmitted via communication means such as wireless communication or wired communication may be applied. The computer readable storage medium is a magnetic disk, an magneto-optical disk, a CD-ROM, a DVD-ROM, a semiconductor memory, or the like.

Figure 2:
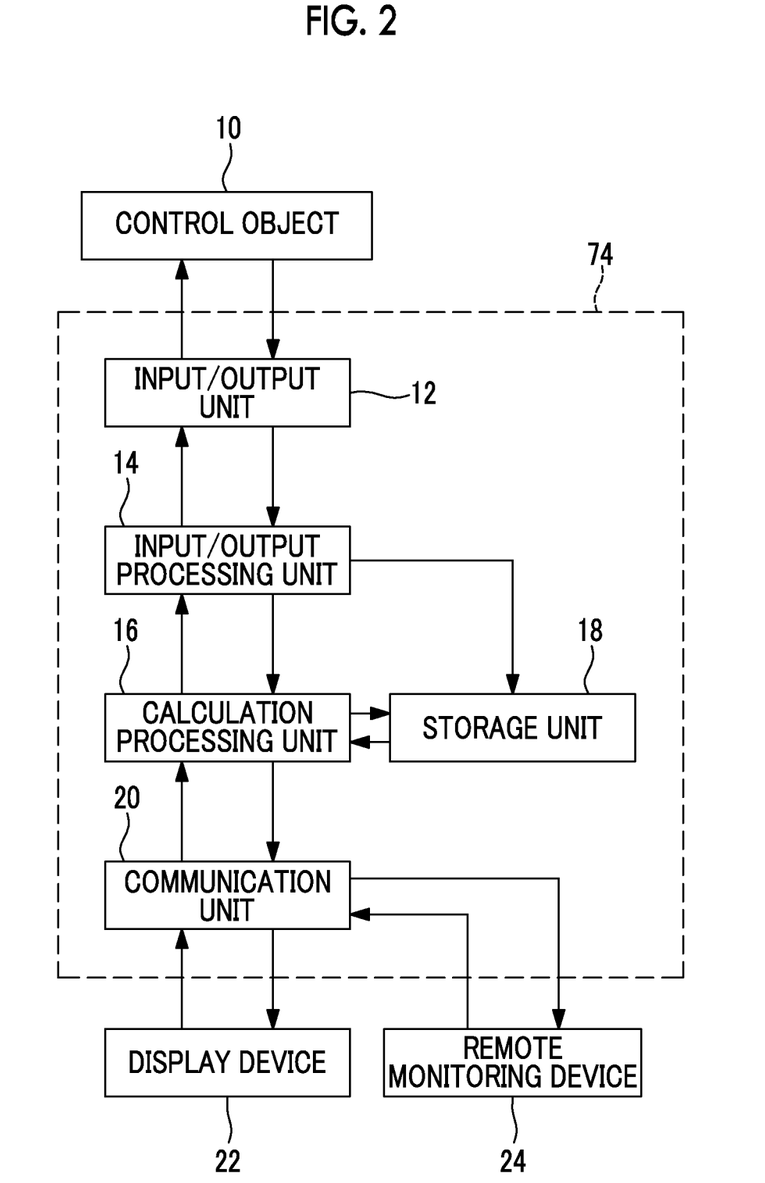
FIG. 2 is a functional block diagram showing a configuration of a chiller control device according to the embodiment of the present invention.

FIG. 2 is a functional diagram showing the configuration of the chiller control device 74.

The chiller control device 74 performs chiller diagnosis processing which evaluates the state of the turbo chiller 11 on the basis of the operation data detected at each site of the turbo chiller 11.

For example, the site of the turbo chiller 11 is a relay, an inverter, the turbo compressor 60, the heat exchangers (evaporator 66, condenser 62, and sub cooler 63), or the like. In addition, in descriptions below, the site of the turbo chiller 11 is referred to as a control object 10.

For example, the operation data is the number of times of opening and closing of the relay, a temperature of the inverter, an electric motor current and an evaporator pressure of the turbo compressor 60, a cooling water outlet temperature, a condensation-saturation temperature, and a cooling water flow rate of the heat exchanger, or the like, and the operation data is detected by the above-described various sensors.

The chiller control device 74 includes an input/output unit 12, an input/output processing unit 14, a calculation processing unit 16, a storage unit 18, and a communication unit 20.

The input/output unit 12 is connected to various sensors, and the above-described operation data (analogue signals) is input to the input/output unit 12 from various sensors. Moreover, the input/output unit 12 may output detection start signals or detection stop signals from various sensors. In addition, the input/output unit 12 performs analogue/digital conversion on the operation data which is the analogue signal so as to convert the operation data into digital signals, and outputs the digital signals to the input/output processing unit 14.

The input/output processing unit 14 outputs the operation data input via the input/output unit 12 to the calculation processing unit 16 or the storage unit 18, or outputs the signals from the calculation processing unit 16 to the input/output unit 12.

In order to control the turbo chiller 11, the calculation processing unit 16 generates control signals with respect to various control objects, or performs chiller diagnosis processing on the basis of the operation data.

The storage unit 18 is a nonvolatile storage medium which stores various data such as the operation data. In addition, various operation data (hereinafter, referred to as "reference operation data") when a trial operation of the turbo chiller 11 is performed is stored in the storage unit 18. The reference operation data is the operation data which is obtained in a case where the trial operation of the turbo chiller 11 is performed at a rated load or a partial load, and is used in the chiller diagnosis processing.

In addition, an accumulated time (hereinafter, referred to as an "elapsed time") while the turbo chiller is operated, various correction coefficients used in the chiller diagnosis processing, a threshold value, or the like is stored in the storage unit 18.

The communication unit 20 is connected to a display device 22 or a remote monitoring device 24 via a communication line, and informs the operation state of the turbo chiller 11 or the result of the chiller diagnosis processing. Moreover, the communication line is a line through which the digital signals are transmitted. The display device 22 displays various processing signals by the chiller control device 74. The remote monitoring device 24 can remotely operate the turbo chiller 11.

Figure 3:
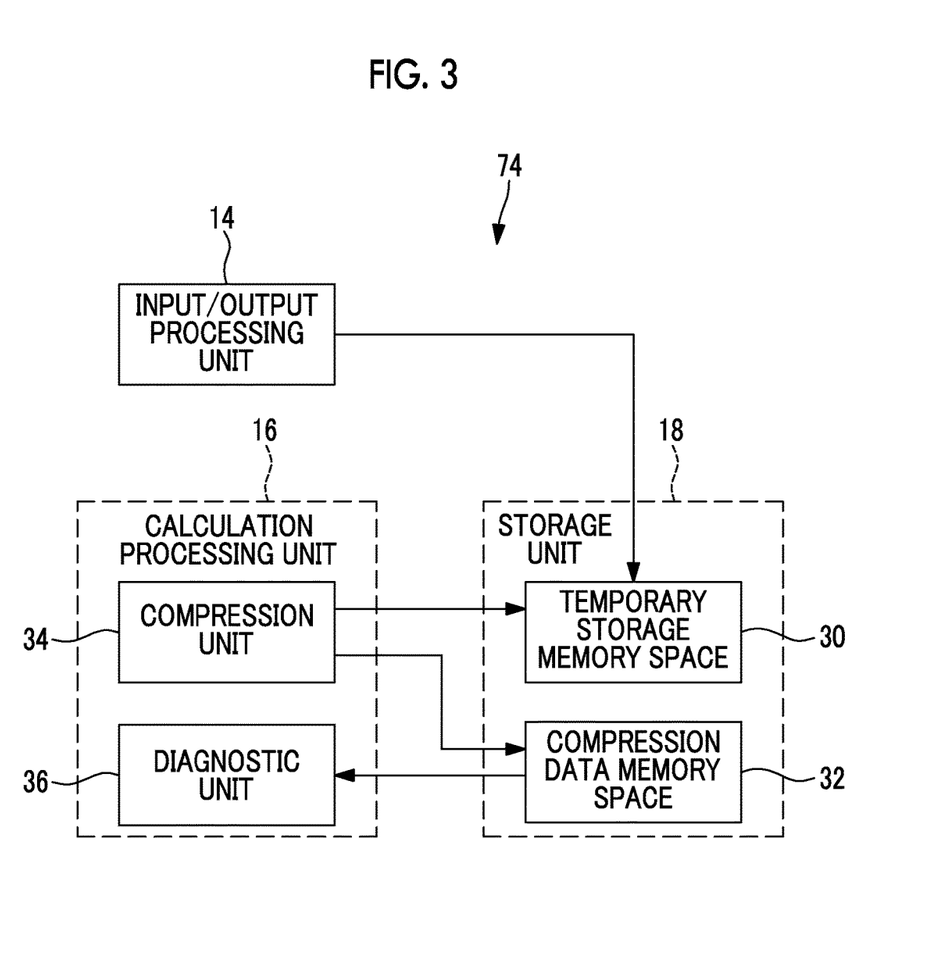
FIG. 3 is a functional block diagram showing configurations of a calculation processing unit and a storage unit according to the embodiment of the present invention.

FIG. 3 is a functional block diagram showing the configurations of the calculation processing unit 16 and the storage unit 18.

The storage unit 18 includes a temporary storage memory space 30 and a compression data memory space 32.

The temporary storage memory space 30 sequentially stores the operation data which is output from the input/output processing unit 14. The compression data memory space 32 stores operation data (hereinafter, referred to as "compression operation data") which is subjected to the operation data compression processing by the calculation processing unit 16.

The calculation processing unit 16 includes a compression unit 34 and a diagnostic unit 36.

The compression unit 34 stores the operation data stored in the temporary storage memory space 30 in the compression data memory space 32 as the compression operation data which is subjected to the operation data compression processing.

The diagnostic unit 36 performs the chiller diagnosis processing on the basis of the compression operation data.

Here, the operation data compression processing will be described in detail.

The operation data output from the input/output processing unit 14 is sequentially stored in the temporary storage memory space 30. Accordingly, the operation data is accumulated in the temporary storage memory space 30 over time, and a data size increases.

In order to continuously store the operation data having the increased data size, a storage capacity of the storage unit 18 should be increased, and a cost of the chiller control device 74 increases.

Accordingly, the operation data having the increased data size is converted by the operation data compression processing each time a condition (hereinafter, referred to as a "compression timing condition") corresponding to the type of the operation data is met, and the data size is compressed. The compression operation data is stored in the compression data memory space 32, and the operation data used in the compression is deleted from the temporary storage memory space 30. Accordingly, since the data size of the compression operation decreases, it is not necessary to increase the storage capacity of the storage unit 18.

In addition, for example, the condition corresponding to the operation data is a continuous operation time of the turbo chiller 11 or the like. In addition, the conversion is extracting an evaluable and necessary portion in the state of the turbo chiller 11 by smoothing the operation data using averaging, approximating, or the like.

In addition, since the temporary storage memory space 30 temporarily stores the operation data, the temporary storage memory space 30 may not be a fixed memory space. However, preferably, the compression data memory space 32 is a fixed memory space.

Next, a specific example of the operation data compression processing will be described.

For example, in a case where the operation data is the number of times of opening and closing of the relay, "1" is incremented to the temporary storage memory space every one opening and closing of the relay. In addition, if the number of times of opening and closing of the relay which are sequentially stored in the temporary storage memory space 30 exceeds 1000 times, the compression unit 34 determines that the compression timing condition is met. In addition, "1000" which is the operation data stored in the temporary storage memory space 30 by the operation data compression processing is converted into "1", and "1" is stored in the compression data memory space 32 as the compression operation data.

In addition, in a case where the compression operation data indicating the number of times of opening and closing of the relay is already stored in the compression data memory space 32, the compression operation data indicating the number of times of opening and closing of the relay is incremented by "1". That is, for example, if the number of times of opening and closing of the relay is 100,000 times, the compression operation data indicating the number of times of opening and closing of the relay stored in the compression data memory space 32 becomes "100".

Moreover, for example, in a case where the operation data has a temporal change such as the electric motor current and the evaporator pressure of the turbo compressor 60, and the cooling water outlet temperature, the condensation-saturation temperature, and the cooling water flow rate of the heat exchanger, the operation data is stored in the temporary storage memory space 30 in time series. In addition, if a predetermined time (for example, one minute) elapses after the previous operation data compression processing is performed, the compression unit 34 determines that the compression timing condition is met. In addition, the operation data which is stored in the temporary storage memory space 30 by the operation data compression processing is averaged and converted, and is stored in the compression data memory space 32 as the compression operation data. Accordingly, the compression operation data which is averaged every one minute is sequentially stored in the compression data memory space 32.

In addition, the compression unit 34 may perform the average stepwise such that the compression unit 34 averages the compression operation data, which is averaged every one minute, every one hour, averages the compression data, which is averaged every one hour, every one day, and averages the compression data, which is averaged every one day, every one month.

In addition, the compression unit 34 may smoothen the operation data for every division corresponding to the size of an operation parameter of the turbo chiller 11 so as to compress the data size. For example, the operation parameter of the turbo chiller 11 is an output load or an opening of the IGV (hereinafter, referred to as a "vane opening"), and the division is an output load ratio or an angle of the vane opening. The output load ratio is a value when the rated load of the turbo chiller 11 is set to 100%.

Figure 4:
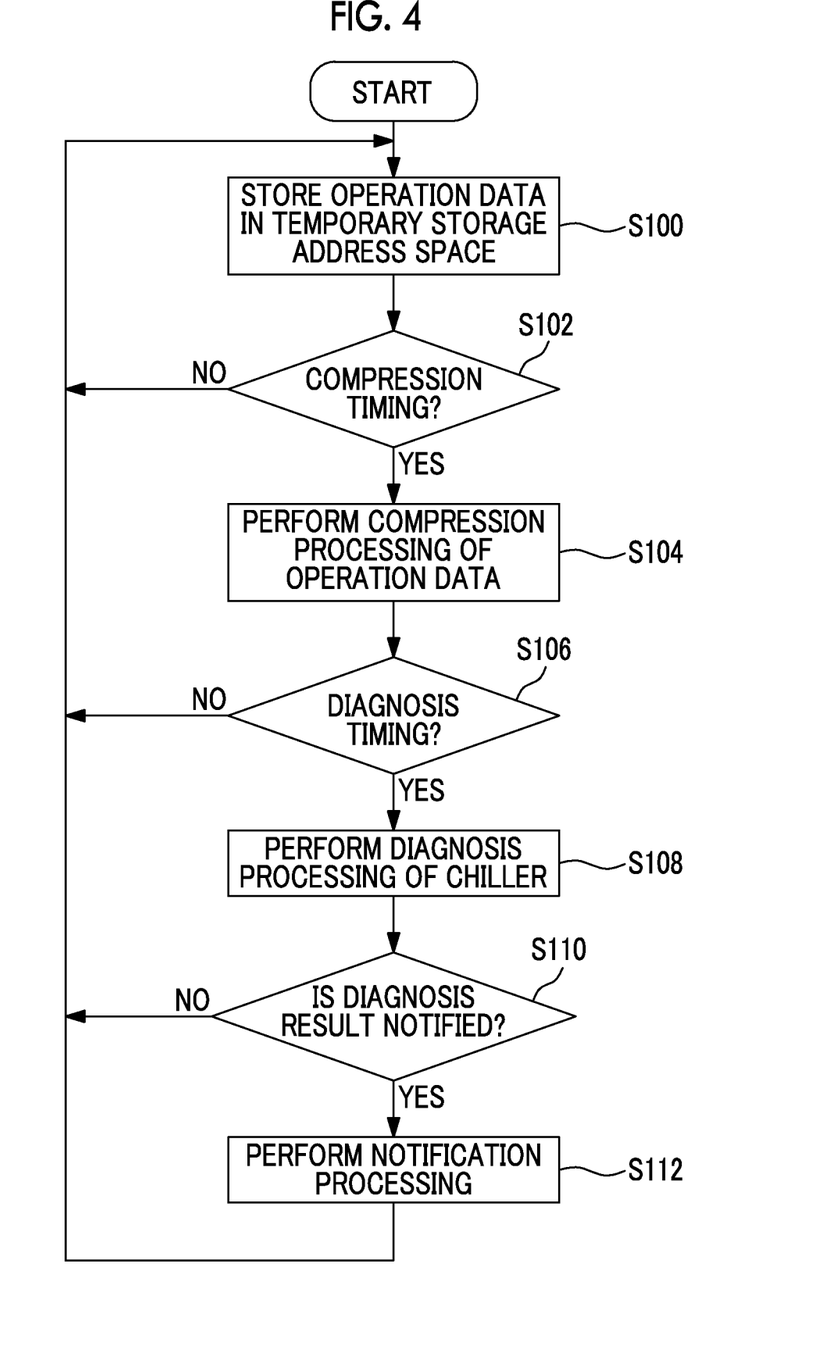
FIG. 4 is a flowchart showing a flow of data compression and diagnosis processing according to the embodiment of the present invention.

FIG. 4 is a flowchart showing the flow of the data compression and diagnosis processing including the operation data compression processing and the chiller diagnosis processing. The data compression and diagnosis processing is performed by the chiller control device 74, starts if the turbo chiller 11 is operated, and ends if the turbo chiller 11 stops. In addition, in the chiller diagnosis processing, a compression timing or a diagnosis timing described below is determined and performed every various operation data.

First, in Step 100, the operation data which is input via the input/output unit 12 is stored in the temporary storage memory space 30 included in the storage unit 18.

Next, in Step 102, it is determined whether or not the compressing timing condition of the operation data is met, and in a case of positive determination, the step proceeds to Step 104. Meanwhile, in a case of negative determination, the step returns to Step 100, and the operation data is continuously stored in the temporary storage memory space 30.

In Step 104, the operation data compression processing is performed.

Next, in Step 106, it is determined whether or not the timing reaches a timing in which the chiller diagnosis processing is performed, in a case of positive determination, the step proceeds to Step 108, and in a case of negative determination, the step returns to Step 100.

In Step 108, the chiller diagnosis processing is performed on the basis of the compression operation data.

Next, in Step 110, it is determined whether or not it is necessary to inform the result of the chiller diagnosis processing, in a case of positive determination, the step proceeds to Step 112, and in a case of negative determination, the step returns to Step S100.

In Step 112, the result of the chiller diagnosis processing is informed to the display device 22 or the remote monitoring device 24, and the step returns to Step 100.

Next, a specific example of the data compression and diagnosis processing will be described.

First, a case where the object of the data compression and diagnosis processing is the heat exchanger will be described. Since the number of tubes may be several hundred in the heat exchanger and corrosion of the heat exchanger significantly influences the turbo chiller 11, correction determination of a deterioration state is required.

The operation data required for the diagnosis with respect to the heat exchanger is the cooling water outlet temperature, the condensation-saturation temperature, the cooling water flow rate, the output load of the chiller, or the like. The cooling water outlet temperature and the condensation-saturation temperature are associated with the cooling water flow rate and the output load ratio of the chiller.

In addition, the operation data is divided according to a load as an operation parameter of the turbo chiller 11. Specifically, the output load ratio is divided into eight such as 20%, 30%, . . . 90%, and 100% (rated), the operation data in which the output load ratio is equal to or more than 15% and less than 25% is divided so as to be approximated as the operation data in which the output load ratio is 20%, and the operation data in which the output load ratio is equal to or more than 25% and less than 35% is divided so as to be approximated as the operation data in which the output load ratio is 30%. Similarly, the operation data in which the output load ratio is equal to or more than 85% and less than 95% is divided so as to be approximated as the operation data in which the output load ratio is 90%, and the operation data in which the output load ratio is equal to or more than 95% and less than or equal to 100% is divided so as to be approximated as the operation data in which the output load ratio is 100%.

In addition, in the operation data compression processing, each of the cooling water outlet temperature and the condensation-saturation temperature divided according to the output load ratio is averaged every predetermined time (for example, one hour) so as to compress the data size.

Next, the chiller diagnosis processing is performed on the basis of the compression operation data.

A result, which is obtained by multiplying a temperature difference (hereinafter, referred to as a "detection temperature difference") between the cooling water outlet temperature and the condensation-saturation temperature which are the compression operation data by a predetermined correction coefficient, is corrected by the current cooling water flow rate or the output load ratio of the turbo chiller 11, and the diagnosis value is calculated.

Meanwhile, a diagnosis reference value is calculated by multiplying a temperature difference (hereinafter, referred to as a "reference temperature difference") between the cooling water outlet temperature and the condensation-saturation temperature which are obtained from the reference operation data according to the division corresponding to the diagnosis value, by a correction coefficient corresponding to the operation elapse time of the turbo chiller 11.

In addition, in the chiller diagnosis processing, a difference (hereinafter, referred to as a "diagnosis temperature difference") between the diagnosis value and the diagnosis reference value is calculated, and the operation state of the turbo chiller 11 is evaluated by comparing the diagnosis temperature difference and the threshold value corresponding to the division. In addition, the threshold value may be changed according to the operation elapse time of the turbo chiller 11. For example, the threshold value is set so as to be small as the elapse time is longer, and the deterioration state of the turbo chiller 11 is strictly determined.

Next, in the chiller diagnosis processing, the different evaluation result according to a deviation state between the diagnosis temperature difference and the threshold value is informed. Accordingly, a manager of the turbo chiller 11 can correctly determine the state of the turbo chiller 11.

In a case where the diagnosis temperature difference does not exceed the threshold value X, it is determined that the diagnosis temperature difference and the threshold value are not deviated from each other and the heat exchanger does not deteriorate, and no notification is performed. Alternatively, it is informed that the state is not in the deterioration state. Meanwhile, if the diagnosis temperature difference exceeds the threshold value X, it is determined that the state is a deviation state and the heat exchanger deteriorates, and an alarm is informed.

For example, in a case where the diagnosis temperature difference exceeds the threshold value X and a first time or more elapses in the duration time, in the chiller diagnosis processing, an alarm in which the state is in a first-degree deterioration state is informed. For example, in the case where the state is in the first-degree deterioration state, a predetermined location on the screen of the display device 22 is displayed by yellow.

In addition, in a case where the diagnosis temperature difference exceeds the threshold value X+a predetermined value Y and a second time or more elapses in the duration time, in the chiller diagnosis processing, an alarm in which the state is in a second-degree deterioration state is informed. For example, in the case where the state is in the second-degree deterioration state, a predetermined location on the screen of the display device 22 is displayed by orange.

Moreover, in a case where the diagnosis temperature difference exceeds the threshold value X+a predetermined value Y+a predetermined value Z, in the chiller diagnosis processing, an alarm in which the state is in a third-degree deterioration state is informed. For example, in the case where the state is in the third-degree deterioration state, a predetermined location on the screen of the display device 22 is displayed by red. In addition, in the case where it is determined that the state is in the third-degree deterioration state, the chiller control device 74 may stop the turbo chiller 11.

Next, a case where the object of the data compression and the diagnosis processing is the turbo compressor 60 will be described. The turbo compressor 60 is a main portion of the turbo chiller 11. Accordingly, if the turbo compressor 60 fails, the turbo compressor 60 is removed and required to be repaired in a factory, and since the turbo compressor 60 largely influences the turbo chiller 11, the correct determination of the deterioration state is required.

The operation data for diagnosing the turbo compressor 60 is the electric motor current, the vane opening, the output load ratio of the chiller, or the like. In addition, the electric motor current is associated with the vane opening or the output load ratio.

In addition, the electric motor current is divided into eight according to the output load ratio of the turbo chiller 11, in the operation data compression processing, the electric motor currents divided according to the output load ratio are averaged every predetermined time (for example, one day) so as to compress the data size.

In addition, in a case where the vane opening is excessively changed, the value of the electric motor current is not used in the operation data compression processing. If the vane opening is excessively changed, the electric motor current may be changed. Accordingly, this operation data is used, accuracy of the diagnosis decreases.

Next, the chiller diagnosis processing is performed on the basis of the compression operation data.

In the chiller diagnosis processing, a difference (hereinafter, referred to as a "diagnosis current difference") between the compression operation data which is the electric motor current and the electric motor current obtained from the reference operation data according to the division is calculated, and the operation state of the turbo chiller 11 is evaluated by comparing the diagnosis current difference and the threshold value corresponding to the division.

Moreover, typically, after the turbo chiller 11 is shipped from a factory and several years elapse, deterioration of the turbo compressor 60 occurs. Accordingly, for example, an alarm is informed in two stages. For example, in a case where integration of cases where the diagnosis current difference exceeds the threshold value is less than 20 times, in the chiller diagnosis processing, when the diagnosis current difference exceeds the threshold value, a low level alarm is informed, and when the integration exceeds 20 times, an intermediate level alarm is informed.

In addition, for example, in the chiller diagnosis processing, "1" is incremented as the number of times of abnormal variation each time the compression operation data indicating the electric motor current or the evaporator pressure is changed to be equal to or more than a predetermined value within a short time (for example, one minute), in a case where the number of times of abnormal variation is maintained during a predetermined time or more or in a case where the number of times of abnormal variation which repeatedly occurs is equal to or more than a predetermined number of times, an alarm may be informed.

In addition, the chiller diagnosis processing may be performed on the basis of a lubricant system of the turbo compressor 60. The operation data required in this case is a condenser pressure, a lubricant pressure, the evaporator pressure, or the like.

In addition, the operation data is divided according to the vane opening which is the operation parameter of the turbo chiller 11. Specifically, the vane opening is divided into nine such as 10%, 20%, . . . 90%, and 100%), the operation data in which the vane opening is equal to or more than 5% and less than 15% is divided as the operation data in which the vane opening is 10%, and the operation data in which the vane opening is equal to or more than 15% and less than 25% is divided as the operation data in which the vane opening is 20%. Similarly, the operation data in which the vane opening is equal to or more than 85% and less than 95% is divided as the operation data in which the vane opening is 90%, and the operation data in which the vane opening is equal to or more than 95% and less than or equal to 100% is divided as the operation data in which the vane opening is 100%.

In addition, in the operation data compression processing, each of the lubricant pressure and the evaporator pressure corresponding to the divided vane opening is averaged every predetermined time (for example, one hour) so as to compress the data size.

Next, the chiller diagnosis processing is performed in the basis of the compression operation data.

By multiplying a pressure difference (hereinafter, referred to as a "detection pressure difference") between the lubricant pressure and the evaporator pressure which are the compression operation data by a predetermine correction coefficient on the basis of the relationship between the condenser pressure and the evaporator pressure, the diagnosis value is calculated.

In addition, in the chiller diagnosis processing, a difference (hereinafter, referred to as a "diagnosis pressure difference") between the diagnosis value and the diagnosis reference value according to the type of the turbo chiller 11 is calculated, and the operation state of the turbo chiller 11 is evaluated by comparing the diagnosis temperature difference and the threshold value corresponding to the division. In addition, the threshold value may be changed according to an operation time of an oil pump. For example, the threshold value is set so as to be small as the operation time is longer, and the deterioration state of the oil pump is strictly determined.

Next, in the chiller diagnosis processing, the different evaluation result according to a deviation state between the diagnosis pressure difference and the threshold value is informed.

In a case where the diagnosis pressure difference does not exceed the threshold value X, it is determined that the diagnosis temperature difference and the threshold value are not deviated from each other and the turbo chiller 11 does not deteriorate, and no notification is performed. Alternatively, it is informed that the state is not in the deterioration state. Meanwhile, if the diagnosis pressure difference exceeds the threshold value X, it is determined that the state is a deviation state and the turbo chiller 11 deteriorates, and an alarm is informed.

For example, in a case where the diagnosis pressure difference exceeds the threshold value X and a first time or more elapses in the duration time, in the chiller diagnosis processing, an alarm in which the state is in a first-degree deterioration state is informed. For example, in the case where the state is in the first-degree deterioration state, a predetermined location on the screen of the display device 22 is displayed by yellow.

In addition, in a case where the diagnosis pressure difference exceeds the threshold value X+the predetermined value Y and a second time or more elapses in the duration time, in the chiller diagnosis processing, an alarm in which the state is in a second-degree deterioration state is informed. For example, in the case where the state is in the second-degree deterioration state, a predetermined location on the screen of the display device 22 is displayed by orange.

Moreover, in a case where the diagnosis pressure difference exceeds the threshold value X+the predetermined value Y+the predetermined value Z, in the chiller diagnosis processing, an alarm in which the state is in a third-degree deterioration state is informed. For example, in the case where the state is in the third-degree deterioration state, a predetermined location on the screen of the display device 22 is displayed by red. In addition, in the case where it is determined that the state is in the third-degree deterioration state, the chiller control device 74 may stop the turbo chiller 11.

In addition, in a case where the object of the data comparison and diagnosis processing is the relay, in the data compression and diagnosis processing, a value when the number of times of opening and closing of the relay stored as the compression operation data exceeds 200 times is set to the threshold value, and an alarm is informed.

Moreover, in a case where the object of the data comparison and diagnosis processing is a capacitor of the inverter, in the data compression and diagnosis processing, the temperature of the inverter stored as the compression operation data is multiplied by a correction coefficient corresponding to the operation time of the turbo chiller 11, and in a case where the multiplication value exceeds the threshold, an alarm is informed.

In addition, since the chiller control device 74 stores the operation data which is detected at each site of the turbo chiller 11, the chiller control device 74 can display maintenance information at each site of the turbo chiller 11 with respect to the display device 22.

In addition, for example, in the basis of the result (a deterioration state at each site of the turbo chiller 11) of the chiller diagnosis processing, the chiller control device 74 may set a maintenance timing early with respect to a site in which deterioration proceeds, and the chiller control device 74 may set a maintenance timing late with respect to a site in which deterioration does not proceed.

In this way, since the chiller control device 74 compresses and stores the operation data, various operation data is stored for a long period. Accordingly, the display device 22 can use the operation data in the determination of the maintenance timing.

As described above, the chiller control device 74 according to the present embodiment, includes the storage unit 18 which stores the operation data which is detected at each site in the turbo chiller 11, the compression unit 34 which converts, when the size of the operation data accumulated in the storage unit 18 over time increases, the operation data each time the condition corresponding to the type of the operation data is met, and compresses the data size, and the diagnostic unit 36 which evaluates the state of the turbo chiller 11 on the basis of the operation data which is converted by the compression unit 34.

Accordingly, the chiller control device 74 can diagnose the state of the turbo chiller 11 without increasing the storage capacity of the storage medium which stores the operation data of the turbo chiller 11.

Therefore, since the state of the turbo chiller 11 can be diagnosed by the chiller control device 74, unlike the related art, a customer who does not have a remote monitoring device or the like having a diagnosis function can perform the diagnosis of the turbo chiller 11.

In addition, since the operation data which is detected at each site of the turbo chiller 11 is compressed and stored, a long-term diagnosis at each site of the turbo chiller 11 can be performed by the chiller control device 74.

Hereinbefore, the present invention is described using the embodiment. However, the technical scope of the present invention is not limited to the range described in the embodiment. Various modifications and improvements can be applied to the embodiment within the scope which does not depart from the gist of the invention, and aspects to which the modifications and the improvements are applied are also included in the technical scope of the present invention. In addition, the embodiments may be appropriately combined.

Moreover, the flow of the data compression and diagnosis processing described in the embodiment is an example. Accordingly, within the scope which does not depart from the gist of the present invention, an unnecessary step may be removed, a new step may be added, or the processing order may be changed.

REFERENCE SIGNS LIST

10: control object
11: turbo chiller
18: storage unit
34: compression unit
36: diagnostic unit
74: chiller control device

The invention claimed is:

1. A chiller control device included in a chiller, the chiller control device comprising:
storage means for storing operation data which is detected at each site in a chiller;
compression means for converting, when the size of the operation data accumulated in the storage means over time increases, the operation data each time a condition corresponding to the type of the operation data is met, and compressing the data size; and
state evaluation means for evaluating the state of the chiller on the basis of the operation data which is converted by the compression means.

2. The chiller control device according to claim 1,
wherein the compression means compresses the data size by smoothing the operation data for every division corresponding to a size of an operation parameter of the chiller, and
wherein the state evaluation means calculates a difference between the operation data compressed by the compression means and a reference value corresponding to the division, and evaluates the operation state of the chiller by comparing the difference and a threshold value corresponding to the division.

3. The chiller control device according to claim 2,
wherein the state evaluation means informs a different evaluation result according to a deviation state between the difference and the threshold value.

4. A chiller comprising:
a turbo compressor to compress a coolant;
a condenser to condense said compressed coolant into a condensed coolant;
a sub cooler that supercools said condensed coolant;
one or more expansion valves to expand the liquid coolant;
an evaporator to evaporate the expanded liquid coolant; and
a chiller control device comprising:
storage means for storing operation data which is detected at each site in a chiller;
compression means for converting, when the size of the operation data accumulated in the storage means over time increases, the operation data each time a condition corresponding to the type of the operation data is met, and compressing the data size; and
state evaluation means for evaluating the state of the chiller on the basis of the operation data which is converted by the compression means.

5. The chiller according to claim 4,
wherein the compression means compresses the data size by smoothing the operation data for every division corresponding to a size of an operation parameter of the chiller, and
wherein the state evaluation means calculates a difference between the operation data compressed by the compression means and a reference value corresponding to the division, and evaluates the operation state of the chiller by comparing the difference and a threshold value corresponding to the division.

6. The chiller according to claim 5, wherein the state evaluation means informs a different evaluation result according to a deviation state between the difference and the threshold value.

7. A chiller diagnostic method for a chiller using a chiller control device included in the chiller, the method comprising:
- a first step of storing operation data, which is detected at each site in a chiller, in storage means;
- a second step of converting, when the size of the operation data accumulated in the storage means over time increases, the operation data each time a condition corresponding to the type of the operation data is met, and compressing the data size; and
- a third step of evaluating the state of the chiller on the basis of the compressed operation data.

* * * * *